US007542866B1

United States Patent
Lovegren et al.

(10) Patent No.: US 7,542,866 B1
(45) Date of Patent: Jun. 2, 2009

(54) THRESHOLD SETTING FOR A RADAR LEVEL TRANSMITTER

(75) Inventors: Eric R. Lovegren, Big Lake, MN (US); Kurt C. Diede, Apple Valley, MN (US); Ryan R. Carlson, Crystal, MN (US)

(73) Assignee: Rosemount Inc., Eden Prairie, MN (US)

( * ) Notice: Subject to any disclaimer, the term of this patent is extended or adjusted under 35 U.S.C. 154(b) by 441 days.

(21) Appl. No.: 09/667,297

(22) Filed: Sep. 22, 2000

Related U.S. Application Data (63) Continuation-in-part of application No. 09/234,999, filed on Jan. 21, 1999, now Pat. No. 6,198,424.

(51) Int. Cl.
G01B 21/18 (2006.01)
G01F 23/00 (2006.01)

(52) U.S. Cl. .................... 702/107; 702/50; 702/55; 702/159; 702/166; 73/290 R; 340/618; 342/124

(58) Field of Classification Search ............... 702/100, 702/107, 166, 168, 6, 8, 50, 55, 57, 79, 85, 702/97, 155, 158, 159, 170, 172; 73/290 R; 342/22, 118, 124, 73, 89, 175; 340/618, 340/621

See application file for complete search history.

(56) References Cited

U.S. PATENT DOCUMENTS

| 3,665,466 A | | 5/1972 | Hibbard | ............... 343/12 |
|---|---|---|---|---|
| 3,812,422 A | * | 5/1974 | De Carolis | ............... 324/642 |
| 3,832,900 A | * | 9/1974 | Ross | ............... 73/290 R |
| 3,995,212 A | * | 11/1976 | Ross | ............... 324/642 |
| 4,107,993 A | * | 8/1978 | Shuff et al. | ............... 73/290 R |
| 4,161,731 A | | 7/1979 | Barr | ............... 343/14 |
| 4,489,601 A | * | 12/1984 | Rao et al. | ............... 73/290 R |
| 4,597,183 A | * | 7/1986 | Broding | ............... 33/701 |
| 4,737,791 A | * | 4/1988 | Jean et al. | ............... 342/124 |
| 4,748,846 A | * | 6/1988 | Haynes | ............... 73/290 V |
| 4,838,690 A | * | 6/1989 | Buckland et al. | ............... 356/73.1 |

(Continued)

FOREIGN PATENT DOCUMENTS

EP 0 882 956 A2 12/1998

(Continued)

OTHER PUBLICATIONS

Nozaki, R. et al., "Measurement of the Dielectric Properties of Materials by Using Time Domain Reflectometry", 7th IEEE Instrumentation and Measurement Technology Conference Record, 1990.*

(Continued)

Primary Examiner—Jeffrey R West
(74) Attorney, Agent, or Firm—Westman, Champlin & Kelly, P.A.

(57) ABSTRACT

Disclosed is a method and apparatus for setting threshold values for use by a radar level transmitter to detect reflected wave pulses corresponding to portions of a transmitted microwave pulse which reflect from interfaces contained in a container. The present invention estimates these threshold values based upon various parameters. Some of these parameters can relate to properties of the materials forming the interfaces while others relate to properties of the antenna and user-defined parameters.

12 Claims, 5 Drawing Sheets

U.S. PATENT DOCUMENTS

| | | | | |
|---|---|---|---|---|
| 5,131,271 A * | 7/1992 | Haynes et al. | ............. | 73/290 V |
| 5,134,377 A * | 7/1992 | Reddy et al. | ................. | 324/533 |
| 5,327,139 A | 7/1994 | Johnson | ........................ | 342/22 |
| 5,438,867 A * | 8/1995 | van der Pol | ............... | 73/290 V |
| 5,457,990 A * | 10/1995 | Oswald et al. | ............ | 73/290 V |
| 5,500,649 A * | 3/1996 | Mowrey et al. | ............... | 342/22 |
| 5,599,449 A | 2/1997 | Gnamm et al. | .............. | 210/495 |
| 5,600,248 A * | 2/1997 | Westrom et al. | ............ | 324/522 |
| 5,609,059 A * | 3/1997 | McEwan | .................. | 73/290 R |
| 5,610,611 A | 3/1997 | McEwan | ...................... | 342/89 |
| 5,656,774 A * | 8/1997 | Nelson et al. | ............. | 73/290 V |
| 5,661,251 A | 8/1997 | Cummings et al. | ......... | 73/866.5 |
| 5,672,975 A * | 9/1997 | Kielb et al. | ................. | 324/644 |
| 5,726,578 A * | 3/1998 | Hook | ......................... | 324/643 |
| 5,835,053 A | 11/1998 | Davis | .......................... | 342/22 |
| 5,898,308 A | 4/1999 | Champion | .................. | 324/643 |
| 5,943,908 A * | 8/1999 | Innes et al. | ............... | 73/290 R |
| 5,969,666 A * | 10/1999 | Burger et al. | ............... | 342/124 |
| 5,973,503 A * | 10/1999 | Kuipers et al. | .............. | 324/698 |
| 6,057,772 A * | 5/2000 | Burkett | ....................... | 340/612 |
| 6,087,977 A * | 7/2000 | Rost | .......................... | 342/93 |
| 6,111,547 A * | 8/2000 | Gau et al. | ................... | 343/786 |
| 6,137,438 A * | 10/2000 | McEwan | .................... | 342/134 |
| 6,198,424 B1 * | 3/2001 | Diede et al. | ................... | 342/22 |
| 6,320,532 B1 | 11/2001 | Diede | ......................... | 342/124 |
| 6,373,261 B1 | 4/2002 | Kielb et al. | ................. | 324/644 |
| 6,437,669 B1 * | 8/2002 | Welstand et al. | ............ | 333/246 |
| 6,477,474 B2 | 11/2002 | Diede | ......................... | 702/57 |
| 6,529,085 B2 * | 3/2003 | Hajimiri et al. | ............... | 331/96 |
| 6,545,646 B2 * | 4/2003 | Marchand | .................. | 343/793 |
| 6,622,370 B1 * | 9/2003 | Sherman et al. | .............. | 29/600 |
| 6,626,038 B1 * | 9/2003 | Carsella et al. | ........... | 73/290 R |

FOREIGN PATENT DOCUMENTS

| | | |
|---|---|---|
| EP | 0 882 957 A2 | 12/1998 |
| EP | 0 928 974 A2 | 7/1999 |
| WO | WO 97/06448 | 7/1996 |
| WO | WO-00/43806 * | 7/2000 |

OTHER PUBLICATIONS

Oswald, B. et al., "Determination of Volumetric Water Content in Lossy Geophysical Media Using Time Domain Reflectometry", Antennas and Propagation Society International Symposium Digest, vol. 3: 1997.*

Kramer, G.G et al., "Continuous Measurement Of Cerebral Water Content By Time Domain Reflectometry", Proceedings of the Annual International Conference of the IEEE Engineering in Medicine and Biology Society, vol. 13: 1991.* http://hyperphysics.phy-astr.gsu.edu/hbase/ems2.html, "Electromagnetic Spectrum".*

Matthias Weiβ et al., 1997 IEEE MTT-S Digest, "Novel Methods of Measuring Impurity Levels in Liquid Tanks," Publ. date Jun. 8, 1997, pp. 1651-1654.

(Special Report) Flow, Level, "Pressure, Radar level technology offers accurate, noncontact measurements," Jan. 1996, I&CS, pp. 27-30.

Krohne Technical Data, BM100, BM100EEx, "Reflex-Radar," Dec. 1996, 12 pages.

UCRL-ID-130474, J. Mast, et al., "Micropower Impulse Radar Technology and Applications," Apr. 15, 1998, 14 pages.

*Fundamentals of Applied Electromagnetics*, 1999 Edition, Prentice Hall, Fawwaz T. Ulaby, pp. 293-319.

"Eclipse Guided Wave Radar", Magnetrol, printed from http://www.magnetrol.com/html/eclipse.htm (Jul. 23, 1998).

"Approval Standard Intrinsically Safe Apparatus and Associated Apparatus for use in Class I, II and III, Division 1 Hazardous (Classified) Locations", Factory Mutual Research, Class No. 3610, pp. 1-32 (Oct. 1988).

"Measuring Fluid Levels with Radar", by Steven Ashley, *Mechanical Engineering*, pp. 82-83 (Jan. 1996).

"World's Fastest Solid-State Digitizer", Lawrence Livermore National Laboratory, *Energy & Technology Review*, pp. S1-S6 (Apr. 1994).

"Low-Cost Wideband Spread-Spectrum Device Promises to Revoluionize Radar Proximity Sensors", *Technology Advances*, Electronic Design (Jul. 25, 1994).

* cited by examiner

THRESHOLD SETTING FOR A RADAR LEVEL TRANSMITTER

This is a continuation-in-part of U.S. application Ser. No. 09/234,999, which was filed Jan. 21, 1999 and issued Mar. 6, 2001 as U.S. Pat. No. 6,198,424.

BACKGROUND OF THE INVENTION

The present invention relates to radar level transmitters used in the process control industry to measure levels of materials in storage vessels, such as tanks. More particularly, the present invention relates to a threshold level calculation for establishing threshold levels that can be used by a radar level transmitter to identify material interfaces which are used to calculate material levels.

Radar level transmitters are used in the process control industry to measure levels of materials contained in a tank or vessel by transmitting a microwave pulse into the tank using a radar antenna, receiving a signal relating to reflections of the transmitted microwave pulse, and detecting material interfaces formed by the materials using the signal. Radar level transmitters are also generally adapted to transmit level information relating to the material interfaces to a distant control system.

The materials in the tank could be in a gas, solid, or liquid state. The microwave pulse reflects off the contents of the tank and a return profile of the tank is generated as a signal or waveform. The waveform represents the amplitude of the reflections of the microwave pulses that are received by the radar level transmitter as a function of time. Peaks in the waveform represent received wave pulses corresponding to portions of the microwave pulse that were reflected off impedance discontinuities within the tank. These discontinuities can include various material interfaces such as an antenna-gas interface, a gas-liquid interface, a gas-solid interface, a liquid-liquid interface, such as a layer of oil on water, a liquid-solid interface, a solid-solid interface, and other types of material interfaces. It is desirable to measure the location of these interfaces in order to determine the quantities of the various types of materials in the tank.

The location or levels of these material interfaces can be established using common Time Domain Reflectometry (TDR) principles once the corresponding time locations of the received wave pulses or peaks in the waveform are established relative to a reference time location. Detection of the time location of the received wave pulses generally includes analyzing the waveform for peaks, which exceed a predetermined threshold value. If the tank includes more than one material, multiple threshold values, each relating to a specific material interface, can be used to detect the levels of the various materials.

There is an ongoing need for improved radar level transmitters. Currently, the threshold values are empirically set by an operator of the radar level transmitter. In addition to being time-consuming and requiring a trained operator, this method can lead to inaccurate threshold value settings, which can result in detection errors and erroneous level measurement. Additionally, the amplitudes of the received wave pulses generally have a dependence on several parameters relating to, for example, the properties of the materials contained in the tank, the tank size, the properties of the radar antenna, and temperature. Thus, the threshold values may need to be adjusted each time one of the parameters affecting the amplitudes of the received wave pulses changes, to prevent erroneous measurements. Automation of the setting of the threshold values could save money by increasing the accuracy of the threshold values and reducing the need for trained personnel.

SUMMARY OF THE INVENTION

A method and apparatus for setting threshold values for use by a radar level transmitter to detect reflected wave pulses corresponding to portions of a transmitted microwave pulse which reflect from interfaces contained in a container. The present invention estimates these threshold values based upon various parameters, some of which relate to properties of the materials forming the interfaces while others relate to properties of the antenna and user-defined parameters.

DETAILED DESCRIPTION OF THE PREFERRED EMBODIMENT

The present invention relates to radar level transmitters that can be used to determine the level of materials, such as liquids and solids, contained in a tank, pipe, vessel or other type of container. The present invention automatically determines threshold values which are used by radar level transmitters to locate the levels of the materials.

Figure 1:
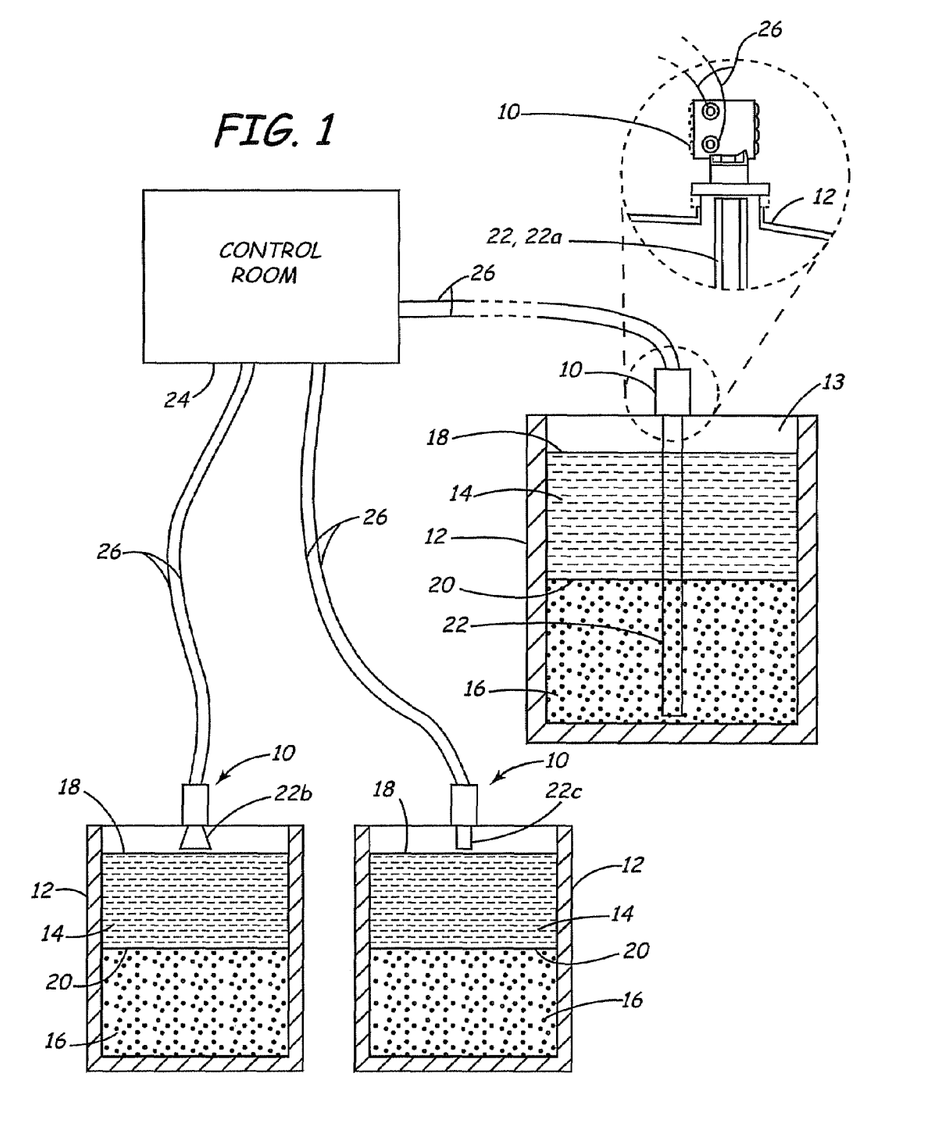
FIG. 1 is a simplified diagram showing radar level transmitter, in accordance with various embodiments of the invention, attached to tanks in a process plant.

FIG. 1 shows an example of an environment in which radar level transmitters 10 generally operate. Radar level transmitters 10 can be mounted on tank 12 above, for example, first, second, and third materials 13, 14, and 16, respectively. A first material interface 18 is located at the junction of first material 13 and second material 14. A second material interface 20 is located at the junction between second material 14 and third material 16. Each radar level transmitter 10 attaches to a radar antenna 22 which generally transmits a microwave pulse into materials 13, 14, and 16.

The transmitted microwave pulse can consist of a wide range of frequencies. Preferred frequencies include 250 MHz to in excess of 20 GHz. In one embodiment, the frequency of the microwave pulse is about 2 GHz having a pulse duration range from approximately 200 picoseconds to approximately 2 nanoseconds. The pulse frequency corresponds roughly to a frequency between about 500 MHz and 5 GHz. Alternatively, lower frequency radio waves can be used to penetrate solids.

Portions of the microwave pulse are reflected off discontinuities within tank 12, such as material interfaces 18 and 20. These reflected wave pulses are received by radar antenna 22 and are used to form a profile of the contents of tank 12. Radar level transmitter 10 can then use known Time Domain Reflectometry (TDR) principles to calculate the levels of first and second material interfaces 18, 20. One embodiment of radar antenna 22 is waveguide 22a, shown in FIG. 1, which extends into first, second, and third materials 13, 14, and 16. The microwave pulse is propagated along waveguide 22a into the materials. One embodiment of waveguide 22a is a twin lead transmission line, which is generally terminated in a short circuit at the bottom end of tank 12. It will be appreciated by those skilled in the art that many equivalent forms of waveguide 22a can be used with radar level transmitter 10, such as a coaxial transmission line or a probe. Additional embodiments of radar antenna 22 include radiating horn 22b and rod antenna 22c, also shown in FIG. 1, which radiate the microwave pulse into tank 12.

Control room 24 is generally remotely located from radar level transmitters 10. Control room 24 can control, and receive information from, radar level transmitters 10 over 2-wire control loops 26. Control loop 26 can be an analog loop, using as a standard 4-20 mA analog signal, or a digital loop, which produces a digital signal in accordance with a digital communication protocol such as FOUNDATION™ Fieldbus or Profibus, or a combination loop, where a digital signal is superimposed upon an analog signal, such as with the Highway Addressable Remote Transducer (HART®). Additionally, radar level transmitter 10 can be a low power transmitter, which is completely powered by energy received over control loop 26.

Figure 2:
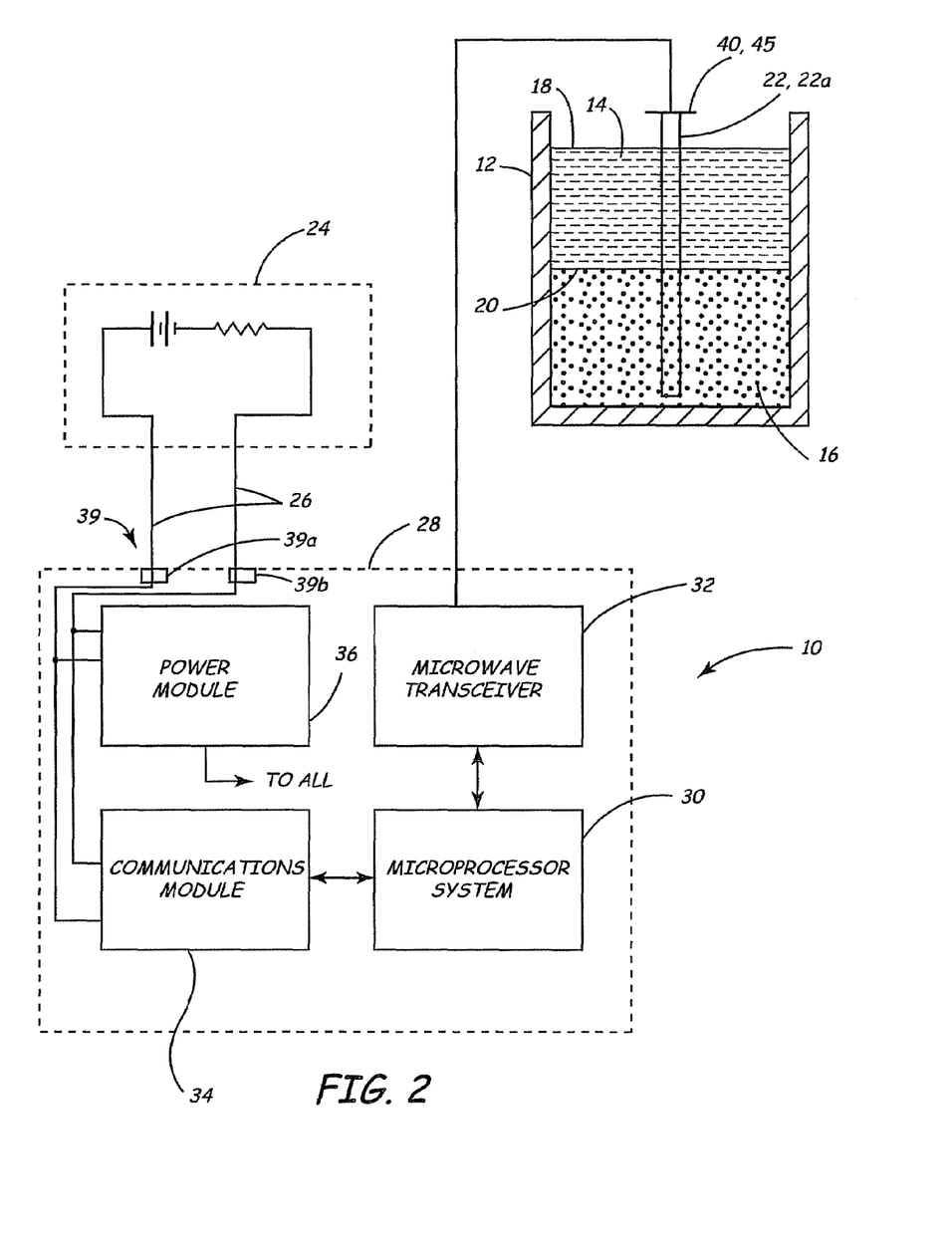
FIG. 2 is a simplified block diagram of a radar level transmitter, in accordance with one embodiment of the invention.

FIG. 2 is a simplified block diagram of radar level transmitter 10 coupled to control room 24 over control loop 26. Electronic circuitry contained in housing 28 of transmitter 10 includes microprocessor system 30, microwave transceiver 32, communications module 34, and power module 36. Radar level transmitter 10 also includes radar antenna 22 depicted as waveguide 22a extending into second and third materials 14 and 16 contained in tank 12.

Microwave transceiver 32 is operatively coupled to antenna 22 and is controlled by microprocessor system 30. Microwave transceiver 32 is adapted to transmit a microwave pulse into tank 12 through antenna 22 and to receive the resulting reflected wave pulses. Microwave transceiver 32 is further adapted to communicate the reflected wave pulses to microprocessor system 30 in the form of an electrical signal having an amplitude that can be plotted with respect to time to form a waveform, such as waveform 38 illustrated in FIG. 3. Transceiver 32 can be a low power microwave transceiver operable within the power constraints of a low power radar level transmitter 10. For example, transceiver 32 can be a micropower impulse radar (MIR) transceiver of the type discussed in detail in either of two patents issued to Thomas E. McEwan, U.S. Pat. No. 5,609,059 entitled ELECTRONIC MULTI-PURPOSE MATERIAL LEVEL SENSOR and U.S. Pat. No. 5,610,611 entitled HIGH ACCURACY ELECTRONIC MATERIAL LEVEL SENSOR.

Microprocessor system 30 is coupled to microwave transceiver 32 and is adapted to calculate interface locations, or levels of materials based upon the time locations of the reflected wave pulses or their time of flight using known TDR principles. Microprocessor system 30 is further configured to produce an output signal that is indicative of the position of first material interface 18 and/or second material interface 20 referred to as a level output signal. The level output signal can be communicated to control room 24 through input/output port 39 using communications module 34. Additionally, microprocessor system 30 can receive information provided at input/output port 39 through communications module 34.

Communications module 34 is coupled to microprocessor system 30 and input/output port 39. In one embodiment, input/output port includes terminals 39a and 39b which couple communications module 34 to process control loop 26. Communications module 34 is adapted to transmit information related to the level output signal over process control loop 26. Additionally, communications module 34 can receive information through input/output port 39, such as calibration information and various parameters that can be processed by microprocessor system 30 to perform calculations relating to the level of materials contained in tank 12. Such information can be transmitted and received by communications module 34 over, for example, control loop 26, in accordance with a digital communication protocol using appropriate circuitry such as a known Universal Asynchronous Receiver Transmitter (UART) (not shown) Alternatively, information can be transmitted and received as an analog signal where a current signal in control loop 26 varies between, for example, 4 and 20 mA. Communications module 34 may use a digital-to-analog converter or other appropriate device to translate the digital signal from microprocessor system 30 to an analog signal that can be transmitted over control loop 26. Likewise, communications module 34 can use an analog-to-digital (A/D) converter to convert an analog signal received from control loop 26 to a digital signal that can be utilized by microprocessor system 30, if necessary. In this manner, transmitter 10 can communicate the levels of first material interface 18 and/or second material interface 20 to control room 24 or to other controllers or devices coupled to process control loop 26. Transmitter 10 can also receive information from control room 24 or other controllers or devices, such as temperature information from a temperature sensor (not shown).

Power module 36 is coupled to microprocessor system 30, microwave transceiver 32, and communications module 34. In one embodiment, power module 36 receives power from control loop 26 and distributes the power to the remaining components of transmitter 10. Power module 36 can also condition the power received from control loop 26 if necessary.

In operation, transceiver 32 generates microwave signals or microwave pulses that are transmitted into tank 12 using antenna 22. As is known in the art, portions of the transmitted microwave pulse, defined as reflected wave pulses, are reflected off discontinuities or impedance mismatches within tank 12. Each material (13, 14 and 16) or medium in tank 12 has a characteristic impedance. As the transmitted microwave pulse travels from one material to another, or reaches a material interface (e.g., 18 or 20), the difference or mismatch between the characteristic impedances of the materials causes a portion of the transmitted microwave pulse to be reflected back toward antenna 22 and a portion to continue onward. The magnitude of the reflected wave pulse is a function of the mismatch of the characteristic impedances of the materials.

Figure 3:
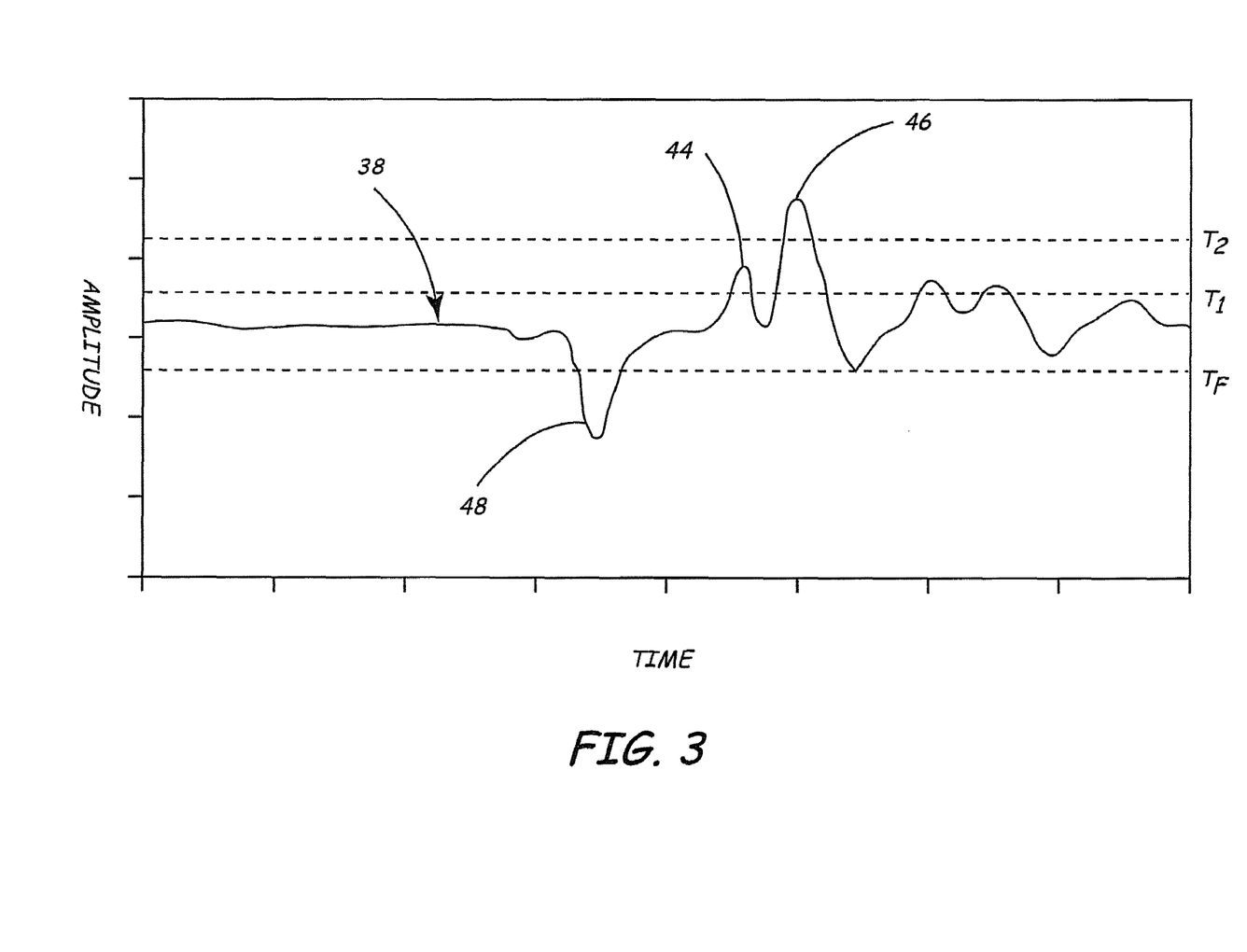
FIG. 3 is plot of a waveform generated by a radar level transmitter, in accordance with another embodiment of the invention.

As mentioned above, discontinuities can exist at first material interface 18, second material interface 20, and fiducial interface 40, which are shown in FIG. 2. A discontinuity exists at first material interface 18 due to the mismatched impedances between first material 13 and second material 14. Likewise, a discontinuity exists at second material interface 20 due to the mismatched impedances between second and third materials 14 and 16. Consequently, first and second reflected wave pulses 44, 46 are produced at first and second material interfaces 18, 20, respectively, in response to a transmitted microwave pulse. FIG. 3 shows waveform 38, in the form of a plot of reflected energy received by microwave transceiver 32, which depicts examples of first and second reflected wave pulses 44 and 46.

Fiducial interface 40 is a reference impedance mismatch or discontinuity that produces a reflected wave pulse in the form of a fiducial pulse 48, shown in FIG. 3, in response to the transmitted microwave pulse. Fiducial interface 40 is a known impedance mismatch within the path of the transmitted microwave pulse that typically does not change over time. Fiducial interface 40 is typically a component/air interface, but can be any boundary between two substances that have different dielectric constants. Fiducial interface 40 could be located, for example, between first material 13, disposed above first material interface 18, and launch plate 45 (FIG. 2), antenna 22, a series capacitor (not shown), or any other suitable component. Fiducial pulse 48 can be used as a reference, from which the times of flight, or the time locations relative to fiducial pulse 48, of first and second reflected wave pulses 44 and 46 can be determined. The levels of first and second material interfaces 18 and 20 can then be calculated using the times of flight or relative time locations, using known TDR principles.

The general method used by microprocessor system 30 to detect fiducial pulse 48, first reflected wave pulse 44, and second reflected wave pulse 46, involves establishing threshold values which correspond to each of the reflected wave pulses of waveform 38. The time location of a particular reflected wave pulse can be ascertained by determining where waveform 38 crosses a threshold value that is set to detect the particular reflected wave pulse. The time location of a detected reflected wave pulse could be taken at many locations. These locations include: the leading edge of the reflected wave pulse; the trailing edge of the reflected wave pulse, midway between the points which cross the threshold value, the peak value of the reflected wave pulse that lies above the threshold value or, any other suitable location along the detected reflected wave pulse. In the illustration of FIG. 3, fiducial threshold value TF is defined to detect fiducial pulse 48, first threshold value T1 is defined to detect first reflected wave pulse 44, and second threshold T2 is defined to detect second reflected wave pulse 46.

The threshold values needed to detected a desired reflected wave pulse can change as properties of transmitter 10 and properties of the contents of tank 12 change. For example, if radar antenna 22 is changed from radar horn 22B to waveguide 22A, threshold values TF, T1 and T2 may need adjustment to ensure that they properly detect the associated reflected wave pulse 48, 44, and 46, respectively. Additionally, changes in temperature and pressure can also have an effect on the properties of antenna 22 and the materials contained within tank 12, thus requiring modifications to threshold values TF, T1 and T2.

Use of empirical methods to set the threshold values TF, T1 and T2 can be time-consuming, especially when they require periodic adjustment due to changing properties of transmitter 10, environmental parameters, and/or the contents of tank 12. The present invention improves on the prior art by providing a method for setting threshold values TF, T1 and T2 quickly and accurately. In addition, the method used by the present invention to set threshold values TF, T1 and T2 allows for easy adjustment of threshold values TF, T1 and T2 when the properties of transmitter 10, environmental parameters, or the materials contained within tank 12 change.

The threshold calculations of the present invention are generally performed by software instructions. Although the following describes the software instructions as being stored within microprocessor system 30, it should be understood that the software instructions could be stored and executed externally to transmitter 10, such as in control room 24, where threshold values TF, T1 and T2 are communicated to microprocessor system 30 through input/output port 39 and communications module 34.

Figure 4:
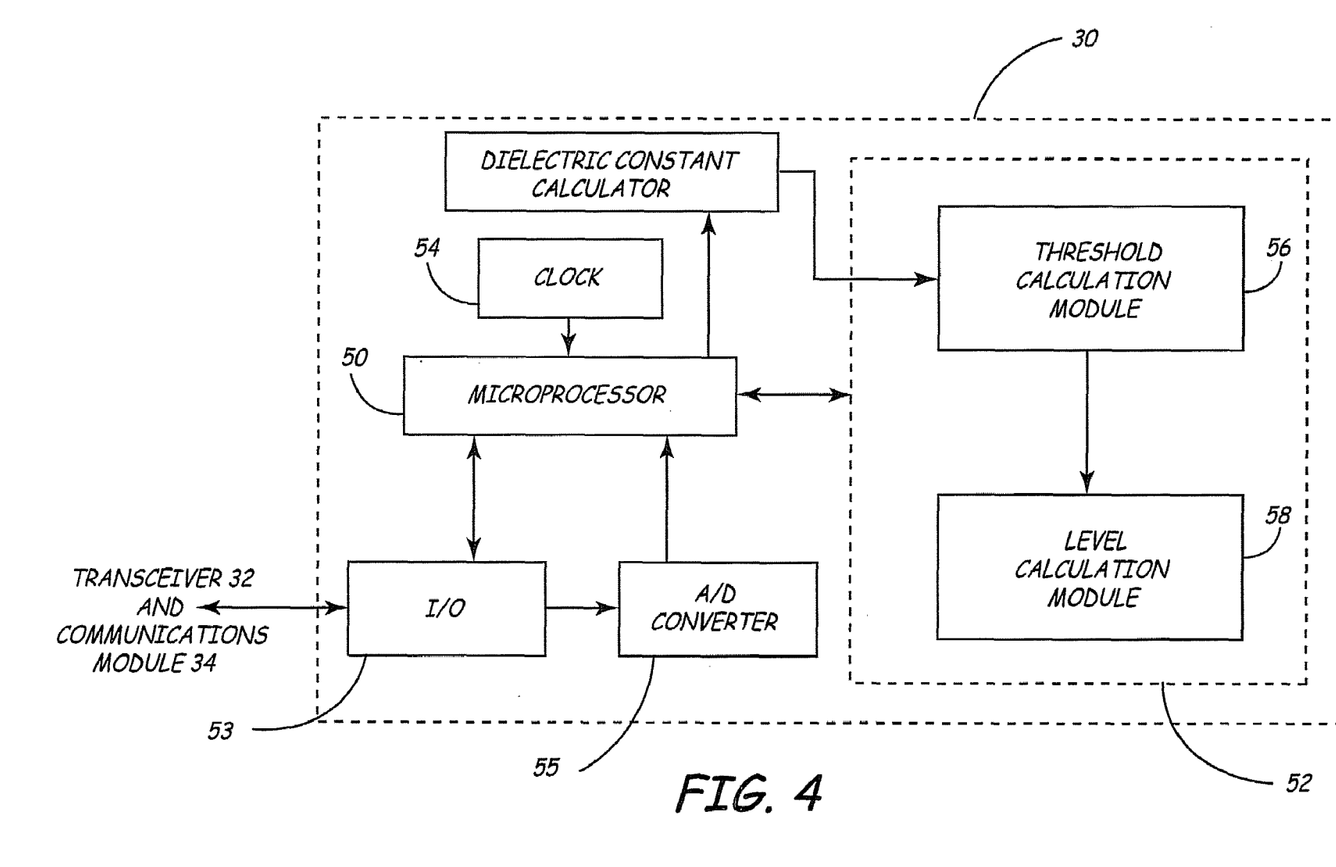
FIG. 4 is a simplified block diagram of a microprocessor system of a radar level transmitter, in accordance with an embodiment of the invention.

Referring now to FIG. 4, one embodiment of microprocessor system 30 includes microprocessor 50, memory 52, input/output (I/O) port 53, clock 54, and analog-to-digital (A/D) converter 55. Clock 54 communicates a clock signal to microprocessor 50 and is used to control the operations of microprocessor 50. Microprocessor 50 communicates with memory 52 and is adapted to store and retrieve data from memory 52 and retrieve and execute instructions stored in memory 52. I/O port 53 allows microprocessor system 30 to communicate with microwave transceiver 32 and communications module 34, shown in FIG. 2. A/D converter 55 can be used by microprocessor system 30 to convert analog signals received from I/O port 53 to digital form for microprocessor 50. Typically, all components in A/D converter 55 are controlled by a clock signal which can be derived from clock 54.

Memory 52 includes threshold calculation module 56 and level calculation module 58, which each contain instructions that can be executed by microprocessor 50. Threshold calculation module 56 is configured to provide level calculation module 58 with threshold values that are used by level calculation module 58 to detect reflected wave pulses in waveform 38 received from microwave transceiver 32. In one embodiment, threshold calculation module 56 provides fiducial threshold value TF and first threshold value T1 for standard level detection by level calculation module 58. In another embodiment, threshold calculation module further provides second threshold value T2 and additional threshold values as are needed by level calculation module 58 to perform interface detection below first material interface 18.

Figure 5:
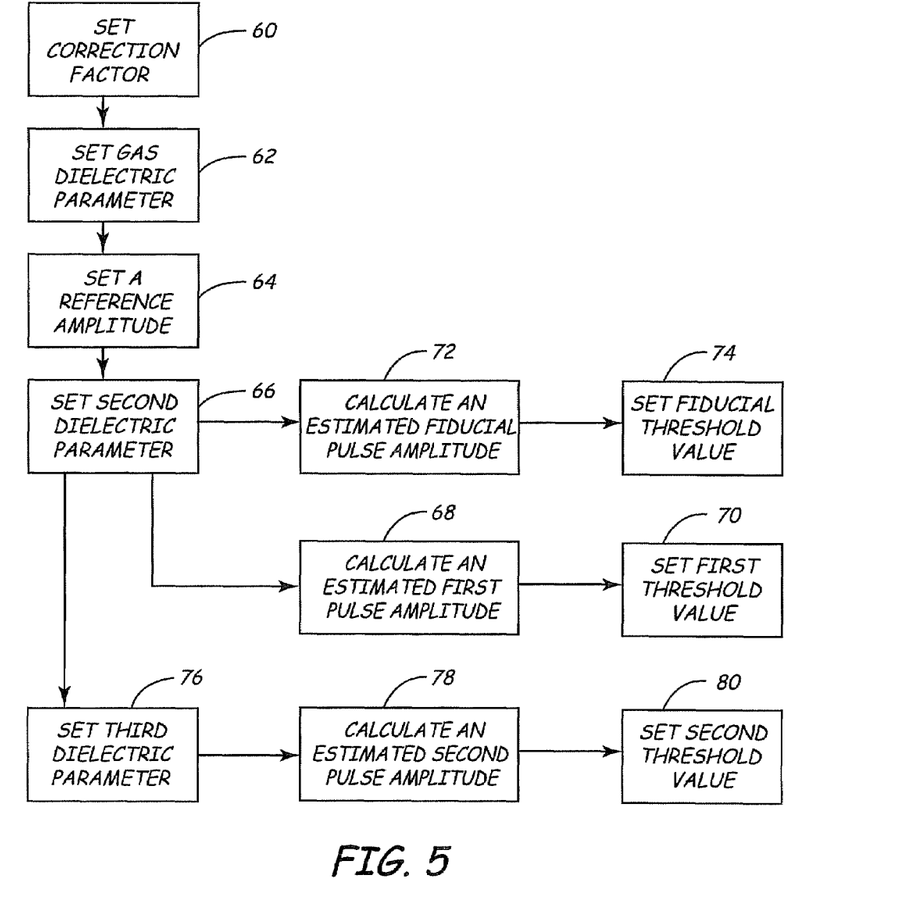
FIG. 5 is flow chart illustrating methods which can be implemented by a radar level transmitter in accordance with various embodiments of the invention.

FIG. 5 shows a flow chart of a general method that can be used to provide threshold calculations to establish fiducial threshold value TF, first threshold value T1 and second threshold value T2. At step 60, a correction factor is set in accordance with the properties of radar antenna 22 (FIG. 1) used by radar level transmitter 10. These properties can include, for example, the dimensions of the conductors used in a co-axial seal probe or a two-wire probe. At step 62, a first dielectric parameter is set to a value that corresponds to the dielectric of first material 13 at fiducial interface 40. It should be understood that the medium at fiducial interface is typically gas, but could be a liquid or solid as well. The dielectric of the first material 13 will generally have a dependence upon the vapor content of the gas. A reference amplitude is set to a value that relates to the amplitude of the transmitted microwave pulse, at step 64. At step 66, a second dielectric parameter is set to a value that corresponds to the dielectric of second material 14. At step 68, an estimated first pulse amplitude is calculated as a function of the reference amplitude, the correction factor, the first dielectric parameter, and the second dielectric parameter. The estimated first pulse amplitude relates to the first reflected wave pulse 44 corresponding to a portion of the transmitted microwave pulse that is reflected at first material interface 18. These calculations are known in the industry and can be found in textbooks relating to electromagnetics, such as the Fundamentals Of Applied Electromagnetics 1999 Edition, by Fawwaz T. Ulaby, published by Prentice-Hall, Incorporated.

At step 70, a threshold calculation sets first threshold value T1 as a function of the estimated first pulse amplitude. In general, first threshold value T1 is set to a predetermined percentage of the estimated first pulse amplitude. The correction factor, first dielectric parameter, and second dielectric parameter, can be set by an operator who could be, for example, communicating with microprocessor system 30 over process control loop 26 from control room 24. The operator can set the parameters using a computer by either inputting the values with a keyboard and/or selecting the values from a table, which can be stored for use by, for example, threshold calculation module 56.

In one embodiment, a threshold calculation is made to establish fiducial threshold TF. Here, an estimated fiducial pulse amplitude is calculated at step 72 as a function of the reference amplitude, the correction factor, and the first dielectric parameter, which were set at steps 60 and 62, respectively. Threshold calculations then can set fiducial threshold value TF as a function of the estimated fiducial pulse amplitude, at step 74. Generally, fiducial threshold value TF is set to a predetermined percentage of the estimated fiducial pulse amplitude. Alternatively, fiducial threshold value TF can be set empirically, by an operator.

In another embodiment, the threshold calculations include a calculation of second threshold value T2, which can be used to detect second reflected wave pulse 46 corresponding to a portion of the transmitted microwave pulse reflected off second material interface 20. Here, a third dielectric parameter is set at step 76. The third dielectric parameter has a value that corresponds to the dielectric of third material 16 (FIG. 2). At step 78, an estimated second pulse amplitude is calculated as a function of the reference amplitude, the correction factor, and the first, second, and third dielectric parameters. Finally, at step 80, second threshold value T2 is calculated as a function of the estimated second pulse amplitude. Preferably, second threshold value T2 is set to a predetermined percentage of the estimated second pulse amplitude.

In one embodiment of the invention, the correction factor has a temperature dependence. This temperature dependence can be taken into account by either using an equation that calculates the correction factor as a function of temperature or by using a look up table for the particular antenna 22. In one embodiment, microprocessor system 30 can receive a temperature signal (not shown) that relates to the temperature of the materials in tank 12 and radar antenna 22. Here, microprocessor 50 can calculate the correction factor as a function of the temperature signal or select the appropriate correction factor that corresponds to the measured temperature.

In yet another embodiment, the correction factor is also a function of a range factor that generally corresponds to the type of scan to be performed by radar level transmitter 10. The range factor generally takes into account the attenuation of the reflected wave pulses that occurs when the reflected wave pulses travel through a medium. The greater the distance radar level transmitter 10 is to scan, the greater the attenuation of the reflected wave pulses. If this attenuation is not taken into account, detection errors can result. For example, if the material interfaces are within a close range, the amplitude of the reflected wave pulses may be greater than expected resulting in the improper detection of some of the reflected wave pulses because the threshold values are set too low. Also, if the material interfaces are within a long range, the amplitude of the reflected wave pulses may be less than expected resulting in the failure to detect the reflected wave pulses because the threshold values are set too high. The range factor generally operates to adjust the threshold values such that reflected wave pulses that are reflected off material interfaces that are within a short or a long range will be properly detected.

In one embodiment, the range factor is set in accordance with either a long-range scan or a short-range scan. The distances corresponding to whether the range factor is set to the long-range or short-range scan depends, in part, on the type of radar antenna 22 being used. For example, if radar antenna 22 is in the form of a wave guide 22A, the range factor will be set to long-range if scans are to be made beyond a predetermined distance and set to short-range for scans shorter than the predetermined distance. The predetermined distance could be, for example, fifteen feet. The range factor can be used to either increase or decrease the threshold value depending on the type of scan to be performed.

In yet another embodiment, fiducial threshold value TF, first threshold value T1, and second threshold value T2 can be offset by an offset value that is set by an operator. The offset value can be used to either increase or decrease the desired threshold values by a fixed amount. These adjustments are generally made after an examination of the performance of the radar level transmitter 10.

Radar level transmitter 10 can also include a dielectric constant calculator 82 that is configured to calculate a dielectric constant of second material 14 as a function of the amplitude of the first reflected wave pulse 44 and the reference amplitude. The use of a dielectric calculator in a radar level transmitter 10 is disclosed in U.S. patent application Ser. No. 09/234,999 filed Jan. 11, 1999 and entitled, MULTIPLE PROCESS PRODUCT INTERFACED DETECTION FOR A LOW POWER RADAR LEVEL TRANSMITTER, which is herein incorporated by reference. In this embodiment, threshold calculation module 56 can recalculate the estimated first pulse amplitude and threshold value T1 with the first dielectric parameter set to the calculated dielectric constant. As a result, threshold calculation module 56 can initially calculate first threshold value T1 in accordance with the first dielectric constant which is set by an operator and later adjust first threshold value T1 in response using the value obtained from a dielectric constant calculator.

Although the present invention has been described with reference to preferred embodiments, workers skilled in the art will recognize that changes may be made in form and detail without departing from the spirit and scope of the invention.

What is claimed is:

1. A radar level transmitter for providing level detection of materials in a container, the transmitter comprising:
    an antenna;
    a transceiver coupled to the antenna and configured to transmit a microwave pulse, having a transmit pulse amplitude, using the antenna and produce a signal representing reflected wave pulses;
    a microprocessor system coupled to the transceiver and adapted to control the transceiver and process the signal;
    a threshold calculation module executable by the microprocessor system and adapted to receive information related a dielectric constant of a first material and a dielectric constant of a second material and calculate an estimated fiducial pulse amplitude related to a reflected wave pulse from an interface between the antenna and the first material and an estimated first pulse amplitude related to a reflected wave pulse from a first material interface between the first material and the second material, the threshold calculation module further adapted to set a fiducial threshold value based upon the estimated fiducial pulse amplitude and set a first threshold value based upon the estimated first pulse amplitude; and
    a level calculation module executable by the microprocessor system and adapted to establish a level in the container of the first material interface using the signal, the fiducial threshold value and the first threshold value.

2. The radar level transmitter of claim 1, wherein:
    the threshold calculation module is further adapted to calculate a second threshold value as a function of the transmit pulse amplitude and the information related to a dielectric constant of a third material; and
    the level calculation module is further adapted to calculate a level of a second material interface between the second material and the third material using the signal and the second threshold value.

3. The radar level transmitter of claim 2, wherein the second threshold is calculated as a function of at least one of an attenuation factor and a range factor.

4. The radar level transmitter of claim 1, including an input/output port adapted to transmit a level output that is indicative of the first material interface.

5. The radar level transmitter of claim 1, including a dielectric constant calculator adapted to calculate a dielectric parameter relating to one of the first and second materials as a function of the transmit pulse amplitude and a first reflected wave pulse corresponding to a portion of the microwave pulse reflected at the first material interface, and provide the dielectric parameter to the threshold calculation module for use in establishing the level of the first material interface.

6. The radar level transmitter of claim 1, wherein the first threshold value is further calculated as a function of at least one of an attenuation factor and a range factor.

7. The radar level transmitter of claim 1, wherein the fiducial threshold value is further calculated as a function of at least one of an attenuation factor and a range factor.

8. The radar level transmitter of claim 1, wherein the first threshold value is further a function of at least one of an offset value and temperature.

9. The radar level transmitter of claim 1, wherein the first threshold value is calculated as a function of a correction factor.

10. The radar level transmitter of claim 1 wherein the dielectric constants of the materials are received from an operator.

11. The radar level transmitter of claim 1 wherein the dielectric constants of the materials are received over a process control loop.

12. The radar level transmitter of claim 1 wherein the first threshold value is further calculated as a function of a temperature.

* * * * *